US005481590A

United States Patent [19]

Grimes

[11] Patent Number: 5,481,590
[45] Date of Patent: Jan. 2, 1996

[54] SELECTION OF A COMMUNICATION TERMINAL FOR RECEIVING AN INCOMING CALL

[75] Inventor: Gary J. Grimes, Birmingham, Ala.

[73] Assignee: AT&T Corp., Murray Hill, N.J.

[21] Appl. No.: 329,392

[22] Filed: Oct. 26, 1994

[51] Int. Cl.⁶ ........................................ H04Q 7/38
[52] U.S. Cl. ............................ 379/57; 379/58; 379/210; 379/211
[58] Field of Search .................. 379/57, 58, 61, 379/201, 210–212

[56] References Cited

U.S. PATENT DOCUMENTS

| | | | |
|---|---|---|---|
| 4,680,785 | 7/1987 | Akiyama et al. | 379/57 |
| 4,748,655 | 5/1988 | Thrower et al. | 379/57 |
| 4,811,379 | 3/1989 | Grandfield | 379/57 |
| 4,851,820 | 7/1989 | Fernandez | 340/825.44 |
| 4,906,989 | 3/1990 | Kasugai | 340/825.44 |
| 4,920,557 | 4/1990 | Umemoto | 379/61 |
| 5,040,204 | 8/1991 | Sasaki et al. | 379/61 |
| 5,224,150 | 6/1993 | Neustein | 379/57 |
| 5,375,161 | 12/1994 | Fuller et al. | 379/57 |

FOREIGN PATENT DOCUMENTS

0536949  4/1993  European Pat. Off. .

Primary Examiner—Dwayne D. Bost
Attorney, Agent, or Firm—John C. Moran

[57] ABSTRACT

An apparatus that allows a pager to select a telecommunication terminal to which a telecommunications switching system terminates all incoming calls destined for the user of the pager. The selection is made under control of the user. The pager request that communication terminals transmit their identities to the pager. The pager then displays the identities of communication terminals to the user who selects one of the communication terminals to be the selected communication terminal. In response to the selection by the user, the pager signals the selected communication terminal. In turn, the selected communication terminal signals the telecommunications switching system that all incoming calls for the user of pager are to be terminated on the selected communication terminal.

24 Claims, 9 Drawing Sheets

TRANSLATION MEMORY
INFORMATION

- 201 — EXTENSION NUMBER: _______
- 202 — PAGER DIGITAL CODE: _______
- 203 — LINE INTERFACE CIRCUIT (LIC): _______
- 204 — PORT ON LIC: _______
- 205 — NAME: _______
- 206 — COMMUNICATIONS TERMINAL TYPE: _______
- 207 — PAGER TYPE: _______
- 208 — PAGER IDENTIFIER: _______
- 209 — PRIORITY NUMBER LIST: _______
- 210 — CALL COVERAGE EXTENSION: _______

TRANSLATION MEMORY
111

FIG. 3
STATUS MEMORY INFORMATION

FIG. 4
PHYSICAL ARRANGEMENT OF A WIRED OR WIRELESS COMMUNICATIONS TERMINAL

FIG. 5

FIG. 6 PAGER BLOCK DIAGRAM

FIG. 7
BLOCK DIAGRAM OF WIRED OR WIRELESS COMMUNICATIONS DEVICE

SELECTION OF A COMMUNICATION TERMINAL FOR RECEIVING AN INCOMING CALL

TECHNICAL FIELD

The present invention relates to pagers used with telecommunication switching systems and, more particularly, to an arrangement that allows a pager to specify the telecommunication terminal to which the telecommunication switching system will direct all incoming calls for the user of the pager.

BACKGROUND OF THE INVENTION

With a pager, the reception of a predetermined radio signal typically activates an audible and/or visual alarm to indicate that the person calling the pager should make a call to a predetermined telephone number to receive a message. In the alternative, the pager may have the capability to receive an incoming message that is displayed on the pager. This message communicates a predefined amount of information which may include the telephone number of a calling party. Unfortunately, the pager normally has a telephone number different from that associated with the telephone set of the called party. As a result, a calling party must dial two different telephone numbers, the first associated with the called party's telephone set and then, if the called party does not answer, dial a second number to alert the called party via his/her pager. If the second number is dialed, the calling party must also wait for a return call from the called party since the pager does not provide two-way communication capability. These operations often result in a considerable number of telephone calls where the two individuals periodically try to contact one another and fail because the other person is unavailable.

One solution to this problem is the use of a cellular telephone. However, cellular telephones are expensive in initial cost and expensive to use because of the cost for each telephone call. Further, there are many environments such as a hospital, manufacturing, education or general office environments where cellular telephones cannot be employed because of the background electrical noise or electromagnetic shielding of these environments.

U.S. Pat. No. 5,311,570 discloses a communication switching system that responds to an incoming call to a called party by signaling the pager as well as the telephone set associated with the called number of the incoming call. The pager is provided with the capability to signal the communication system that the called party will shortly answer the call via a telephone set. The called party then goes to any telephone set connected to the communication system, dials an identification code, and the communication system connects the incoming call to that telephone set. This disclosed system provides the partial solution to the problem; however, it still requires the called party to physically enter an identification code. Published European Patent Office Patent Application EP536949 discloses a system that directs an incoming call to the telephone set nearest the pager. The problem with this solution is that as the user of the pager walks through a business setting, the user's telephone calls are forwarded to all telephones passed by the user.

It is an object of this invention to provide a pager that interacts with a telecommunication switching system so that a user of the pager can select the telephone terminal to which the user's incoming calls will be transferred.

SUMMARY OF THE INVENTION

This and other objects of the invention are achieved by an apparatus that allows a pager to select a telecommunication terminal to which a telecommunications switching system terminates all incoming calls destined for the user of the pager. The selection is made under control of the user. Advantageously, the pager requests that communication terminals transmit their identities to the pager. The pager then displays the identities of communication terminals to the user who selects one of the communication terminals to be the selected communication terminal. In response to the selection by the user, the pager signals the selected communication terminal. In turn, the selected communication terminal signals the telecommunications switching system that all incoming calls for the user of pager are to be terminated on the selected communication terminal.

Both the pager and selected communication terminal continue to monitor transmissions from each other. When the selected communication terminal detects that the transmission signal strength of the pager is below a predefined level, the selected communication terminal signals the telecommunications switching system to cease terminating calls on the selected communication terminal. When the pager detects that the transmission signal strength of the selected communication terminal is below the predefined level, the pager resets itself.

DETAILED DESCRIPTION

Figure 1:
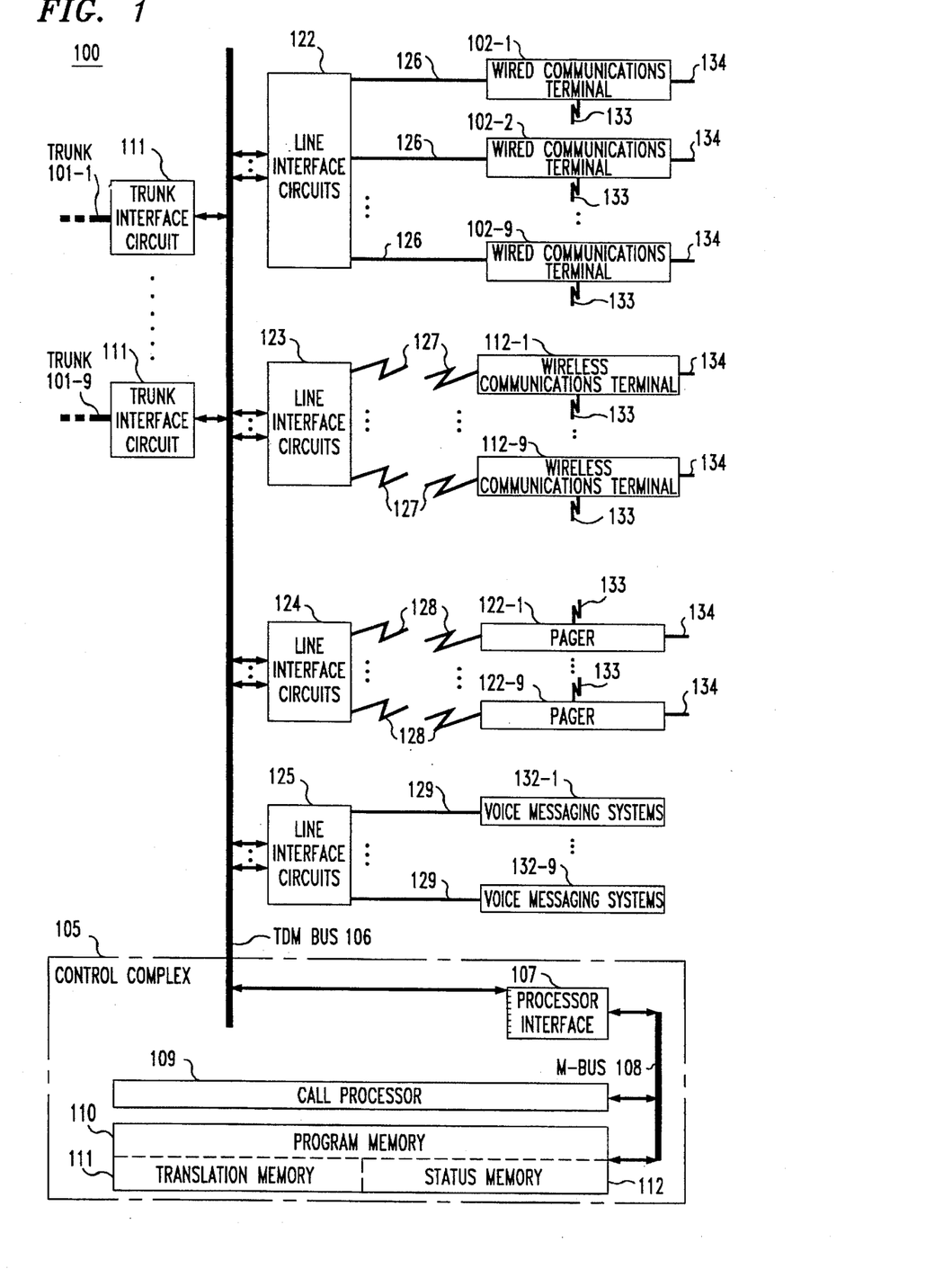
FIG. 1 illustrates, in block diagram form, a telecommunication switching system incorporating the present invention.

FIG. 1 illustrates PBX 100, for example, an AT&T Definity® telecommunications system (Definity is a registered trademark of AT&T) that has a plurality of trunks 101-1 through 101-9 via trunk interface circuits 111 and a plurality of wired communications terminals 102-1 through 102-9 and wireless communications terminals 112-1 through 112-9 via line interface circuits 122 and 123, respectively. The trunks connect to an external communications network (not shown) which may be either a public or private network. A plurality of pagers 122-1 through 122-9 and a plurality of voice mail systems 132-1 through 132-9 are also connected to PBX 100 via line interface circuits 124 and 125, respectively. Each voice mail system has the capability of providing voice announcements to calling parties in certain circumstances, such as when the called party does not answer. Furthermore, it should, of course, be understood that while, in the illustrative embodiment of the present invention, the wired or wireless communications terminals provide full two-way voice communications capabilities, such terminals can also provide a myriad of other communications functions and may include personal computers, video terminals, facsimile machines, environmental sensing terminals, such as smoke detectors, etc. The connection between each port on line interface circuits 122 and 125 to its associated wired communications terminal and voice mail system is respectively provided by one of wired communications links 126 and 129. In similar fashion, the connection between each port on line interface circuits 123 and 124 to its associated wireless communications terminal and pager is respectively provided by one of the wireless communications links 127 and 128.

Each pager provides signal receiving capability and is associated with a respective one of the wired or wireless communications terminal so that a calling party desiring to reach a called party can dial the telephone number associated with that called party's (wired or wireless) two-way communications terminal and alerting signals are activated on both the communication terminal and pager. In addition, pursuant to this embodiment of the present invention, the pager is provided with limited transmission capability wherein a prospective called party who is away from his/her associated wired or wireless communications terminal can signal call processor 109 within control complex 105 to have all calls or calls from a predetermined list of callers forwarded to some other wired or wireless communications terminal not normally associated with this called party. This other wired or wireless communications terminal is one that is selected by the called party using the pager transmitted selection information via this other communications terminal. A prospective called party's desire to initiate such call forwarding and the identification of the selected wired or wireless communications terminal that is near to the called party is communicated to call processor 109 via signals that are initially coupled between the pager and its nearby wired or wireless communications terminals. This coupling is provided, as shown in FIG. 1, via at least one wireless path 133 or through at least one wired path 134. The wireless paths may couple any of a variety of signals, such as radio or infrared signals, and any wired path is established by placing the pager in an electrical receptacle in a wired or wireless communications terminal.

Each of the wired and wireless communications terminals in FIG. 1 is connected to a "port" of an associated one of line interface circuits 122 and 123, respectively. In similar fashion, each of the pagers and voice mail systems is respectively connected to a port on an associated one of line interface circuits 124 and 125. Each line interface circuit has a plurality of ports so that the total number of line interface circuits is less than the total number of wired and wireless communications terminals, pagers and voice mail systems.

PBX 100 provides a communications system switching interface for incoming, outgoing and internal communications. "Incoming" communications are those which originate within the external communications network and are destined for at least one of the wired or wireless communications terminals. "Outgoing" communications are those which originate from one of these communications terminals and are destined for some other communications terminal within the external communications network (both of the latter not shown). In FIG. 1, "internal" communications are those which originate from one of the communications terminals and terminate on a different one of these communications terminals. Of course, as is well-known, PBX 100 can be one PBX in a network of interconnected PBXs and, in such situations, internal communications can also originate from and terminate on communications terminals in different PBXs in the network of PBXs.

For any of the foregoing types of communications, signalling information has to be coupled to the destined wired or wireless communications terminal. This coupling of signalling information is through the control complex 105 but the voice/data communications which follow this signalling transfer is not coupled to the control complex, but rather is transferred directly between the trunk interface and line interface circuit by time-division-multiplexed (TDM) bus 106. Signalling for incoming communications, received via a trunk and its associated trunk interface circuit, are routed to control complex 105 via the TDM bus. Within the control complex, this signalling is serially coupled through processor interface 107 and M-bus 108 to call processor 109. Processor 109 utilizing software stored in program memory 110 and specific system information stored in translation memory 111 and status memory 112, processes the received dialed digits for the incoming communications to provide signalling to the destined communications terminal via its associated line interface circuit and communications link. This connection to the associated line interface circuit is provided via Mbus 108, processor interface 107 and TDM bus 106. Within the associated line interface circuit, the incoming signalling is routed to the port connected to the communications link extending to the destined communications terminal. Similarly, signalling for outgoing communications is outputted to the associated communications link and line interface circuit and then is routed to the control complex via the TDM bus. Within the control complex, the signalling for outgoing communications is serially routed through processor interface 107, M-bus 108 and call processor 109. Within the call processor, the dialed digits are analyzed utilizing software within program memory 110, specific system information stored in the translation and status memories and a signalling interconnection is provided to one of the trunks and its associated trunk interface circuit in accordance with a predetermined routing scheme. This interconnection is provided via the M-bus, processor interface and TDM bus. Internal communications between at least two wired or wireless communications terminals are processed in much the same fashion as just described with the call processor determining the associated line interface circuit associated with the destined communications terminal. The signalling connection to and from the call processor is provided via the TDM bus, processor interface and M-bus. If, however, the destined communications terminal in an internal communications is in another PBX networked with PBX 100, then the call processor routes the signalling to a preselected trunk and trunk interface circuit via the M-bus, processor interface and TDM bus. Within the other PBX, communications services are provided as if the communications originated within that PBX.

Figure 2:
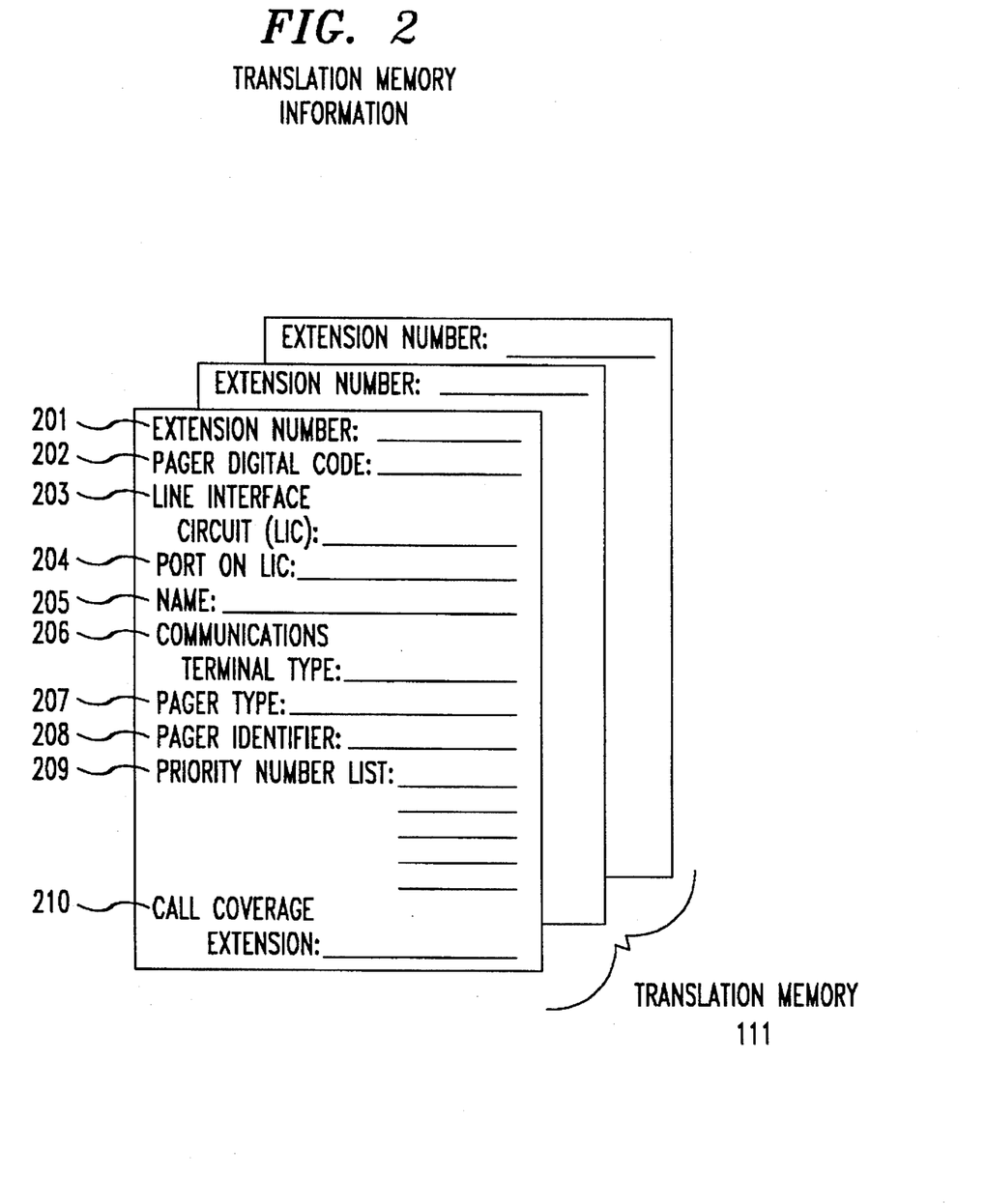
FIGS. 2 and 3 are representations of translation and status data stored in the translation and status memories of the telecommunication switching system of FIG. 1.

FIG. 2 shows the information in translation memory 111. The first item in the translation memory is the extension number 201. This number is used to identify both the wired or wireless communications terminal along with any pager associated with this extension number. The pager digital code 202 is the digital code word to which the pager associated with extension number 201 is responsive. A given pager will be responsive to only one digital code word 202 which is transmitted by the associated line interface circuit 124 while only one line interface circuit 124 is shown in FIG. 1, it should be understood that there is typically a plurality of these circuits as well as a plurality of line interface circuits linking each of the following: wired communications terminals, wireless communications terminals, and voice messaging systems. In any event, the line interface circuit (LIC) number 203 and the port 204 on this LIC are used to identify the physical location of the communication system port interfacing the wired or wireless communications terminal. Name 205 is used to identify the user's name normally associated with extension number 201. The communications terminal type 206 is used to identify the type of communications terminal associated with extension number 201, so that the proper signaling sequence for this communications terminal can be implemented. Similarly, the pager type 207 is used to identify the type of pager so that the proper signaling sequence for this pager can be implemented. The pager code word 208 is used, for security purposes, to verify that the proper pager is responding to any page. This pager code word is automatically transmitted by the pager whenever it transmits signals to communications system 100. The priority number list 209 is a list of extensions or users' names to which the pager will respond when the "priority page" feature, as will be subsequently described, is activated. Finally, call coverage extension 210 identifies the telephone number or extension of the communications terminal to which calls directed to extension number 201 are forwarded when call coverage, a well-known feature in communications systems, is activated.

Figure 3:
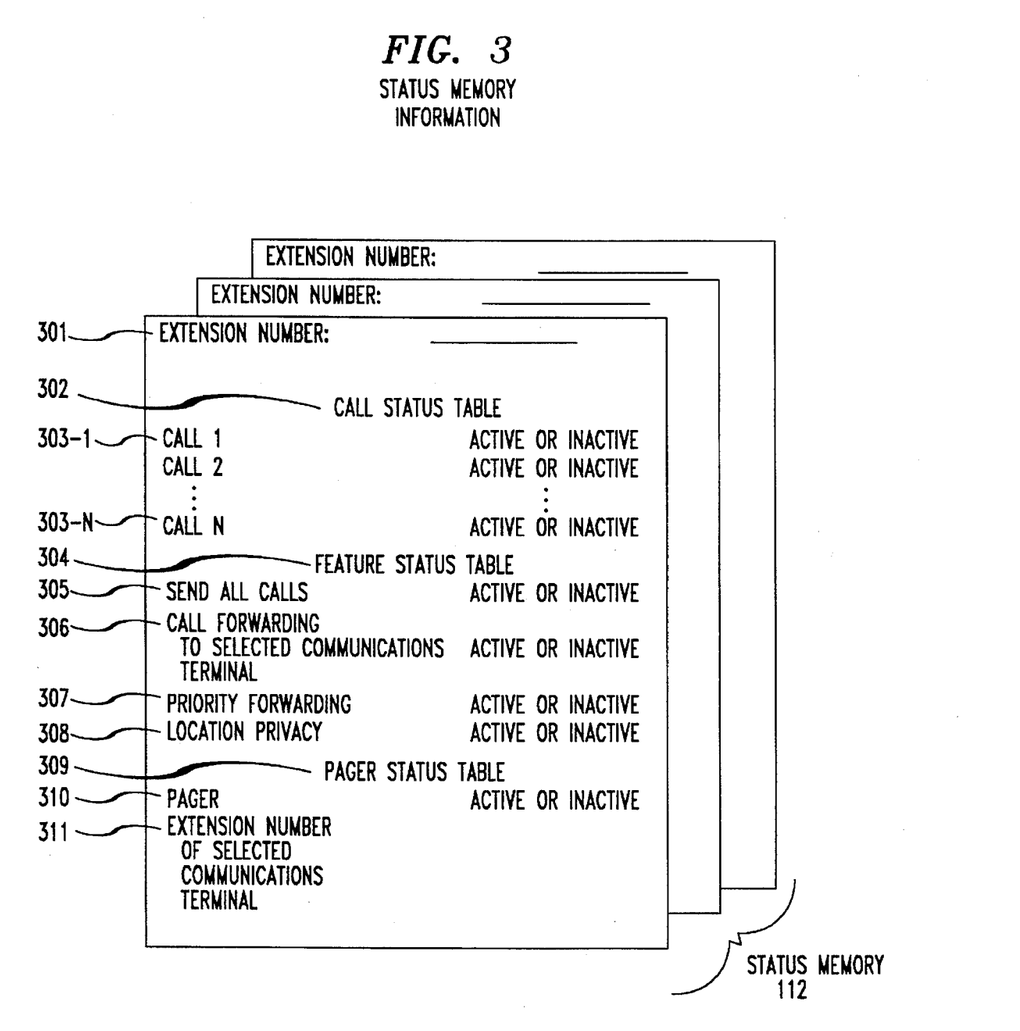

FIG. 3 shows the information in status memory 112. Extension number 301 is analogous to extension number 201 of FIG. 2. The remainder of the status memory information is divided into three tables—the call status table 302, the feature status table 304, and the pager status table 307. Call status table 302 sets forth a list of entries which indicate whether any one of a predetermined integer number, N, of simultaneously receivable calls for an extension number is active or inactive at any given time. These entries are designated as 303-1 through 303-9. Feature status table 304 includes entries 305 through 309.

Entries 305 and 306, respectively, indicate whether the send all calls and call forwarding to a selected communications terminal features are active or inactive. Send all calls is a well-known communications capability wherein calls to a called party's wired or wireless communications terminal are directed to a predetermined call coverage terminal. This call coverage terminal can be a wired or wireless two-way communications terminal. A typical situation where this capability is used arises when a call to a called party is directed to that called party's secretary or assistant. Call forwarding to a selected communications terminal, pursuant to the present invention, is a communications feature wherein incoming communications for a called party are directed to a communications terminal that has been selected by the called party using the pager so that he/she can answer the incoming communications at any given time. Send all calls is similar to call forwarding to a pager selected communications terminal and, indeed, is a species thereof. The difference between send all calls and call forwarding to a pager selected communications terminal is that while the identification of the call coverage terminal can be changed in the send all calls feature, such changes are generally infrequent. Call forwarding to a pager selected communications terminal is associated with a more dynamic situation which contemplates that the prospective called party will be moving about and the identification of the call coverage terminal may be frequently changed. The priority paging feature, designated by entry 307, is a species of call forwarding to a pager selected communications terminal. When the priority paging feature is active for a given pager, call destined for the wired or wireless communications terminal associated with that pager will be forwarded to the currently designated call coverage terminal that has been selected by the called party at any given time only if the incoming communications originated from one of the predetermined list of calling numbers in priority number list 209 of FIG. 2. In this disclosed embodiment, the call coverage terminal that is selected by the called party at any given time is that wired or wireless communications terminal which has been selected by the called party using the pager. Entry 308 indicates whether the location privacy feature is active or inactive. This feature can only be activated when the call forwarding to a selected communications terminal feature is also active. With location privacy feature activated, the fact that the incoming communications has been forwarded to the call coverage terminal will not be given to any users of the communications system including the call coverage party. When the privacy feature is inactive, the call coverage party can be advised of the call forwarding via a display which indicates that the incoming call is not for the call coverage party but for the called party who has activated his/her forward calls to the selected communications terminal feature. The pager status table 309 has entries 310 and 311. Entry 310 indicates whether the pager is active or inactive and entry 311 indicates the extension number of the wired or wireless communications terminal that has been selected by the individual associated with the extension number designated in entry 301. Accordingly, if the call forwarding to a selected communications terminal feature is active, incoming communications to the extension number designated in entry 301 will be redirected to the extension number designated in entry 311.

Figure 4:
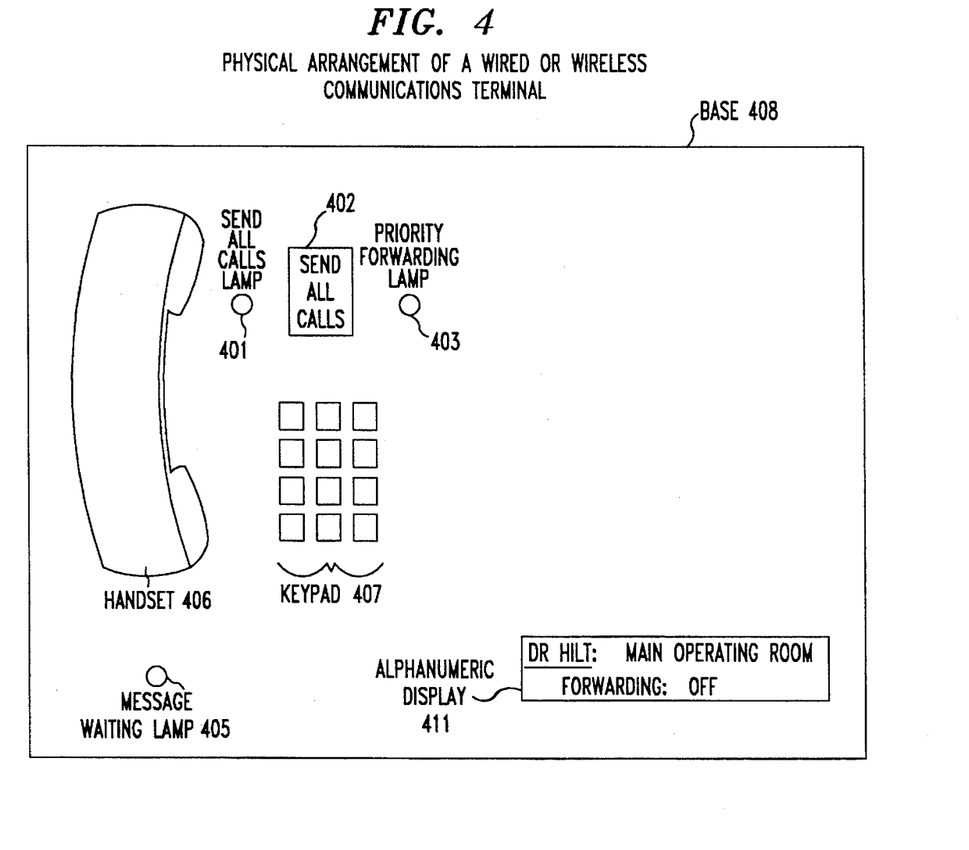
FIG. 4 is a representation of the physical arrangement of a telecommunication terminal for use in the telecommunication system of FIG. 1.

The physical arrangement of an exemplary wired or wireless communications terminal is shown in FIG. 4. The communications terminal has several lamps and buttons in addition to the base 408, the keypad 407, and the handset 406. SEND ALL CALLS button 402 is used to activate and deactivate the send all calls feature, and the feature toggles between the active and inactive states of this feature with each button depression. SEND ALL CALLS lamp 401 is used to alert any user of the communications terminal that the send all calls feature is active as such notification is important since when this feature is active ringing of the communications terminal in response to an incoming call is suspended. Priority forwarding lamp 403 is used to alert the user of the communications terminal that this feature has been activated. Message waiting lamp 405 alerts the user of a retrievable message, e.g., a voice mail message. Lamp 405 is typically controlled by a communications system to be on when there is a message waiting and be off when either there are no messages to be retrieved or when all such messages have already been retrieved.

Figure 5:
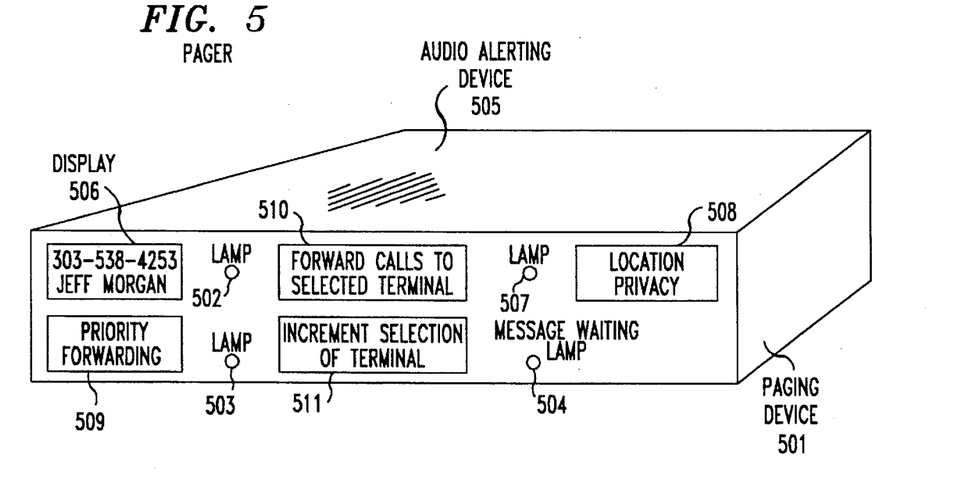
FIG. 5 is a representation of the physical arrangement of a pager for use in the telecommunication system of FIG. 1.

FIG. 5 illustrates pager 501. Pager 501 includes an alphanumeric display 506 capable of displaying both the number associated with a calling party as well as the name or other identifying information of such a party. Pager 501 also includes a message waiting lamp 504 which when lit indicates that there is "unopened" voice mail for the person associated with the pager. In lieu of such a lamp, the function of the message waiting lamp can be provided by an icon which is selectively activated or illuminated on display 506. Audio alerting device 505 alerts the pager user to a new incoming message by emitting one or more audible tones.

Pager 501 utilizes FORWARD CALLS TO SELECTED TERMINAL button 510 and INCREMENT SELECTION OF SET button 511 to select the telecommunications terminal to which calls are to be forwarded. If the forwarding calls feature is activated, this is indicated by lamp 502 being on. When calls are not being forwarded, actuation of INCRE- MENT SELECTION OF TERMINAL button 511 initially causes the closest communications terminal to be identified in display 506. This identification may be the telephone number of the terminal or the name of the user of the communications terminal or both. Each subsequent actuation of INCREMENT SELECTION OF TERMINAL button 511 causes the next farthest communications terminal to have its identification information displayed on display 506. When the user of the pager has the identification information of the desired communications terminal displayed on display 506, the user then actuates FORWARD CALLS TO SELECTED TERMINAL button 510. The selected communications terminal and call processor 109 then coordinate the forwarding of calls to the selected communications terminal. Pager 501 also has PRIORITY FEATURE button 509 which when depressed activates the priority forwarding feature in which only calls from predetermined calling numbers are forwarded to the selected communications terminal. The active or inactive state of the priority forwarding feature is indicated by lamp 503. LOCATION PRIVACY button 508 is used to disable all user output terminals, including displays on communications terminals and voice message systems from conveying the location of the pager user to other users of the communication system.

Figure 6:
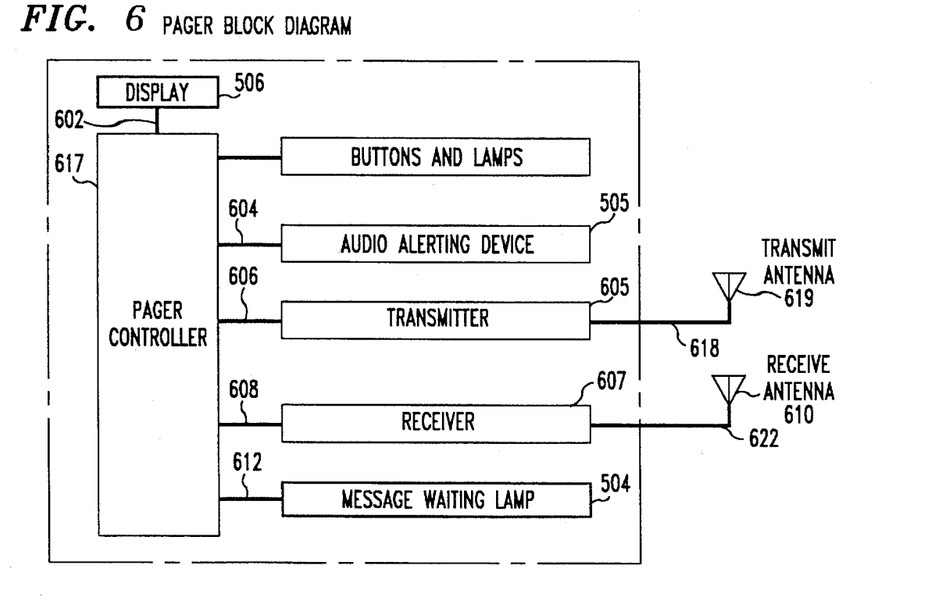
FIG. 6 is a block diagram of the pager of FIG. 5.

FIG. 6 shows the pager block diagram. Pager controller 617 receives information from PBX 100 to activate its alerting device, display and lamps via receive antenna 610, lead 622 and receiver 607 and transmits information to the wired or wireless communications terminal in PBX 100 to activate the call forwarding to a selected communications terminal feature via transmitter 605, lead 618 and transmit antenna 619. In FIG. 6, a single pager antenna could be used and such use of a single antenna is typical of pagers wherein the transmit and receive radio frequencies are the same or closely spaced. If substantially different transmit and receive frequencies are used, then separate receive and transmit antennas can be employed as shown. Of course, in lieu of radio communications between PBX 100 and the pager, infrared or other wireless communications may be used.

Transmit antenna 619 is used to send signals to the wired or wireless communications terminals to activate the call forwarding to a selected communications terminal feature and to identify the selected one of such terminals. As will be described later, each communications terminal transmits a signal that includes the identification of the communications terminal. Those signals are received via receiver 607.

Pager controller 617 implements the selected communications terminal feature as follows: Actuation of INCREMENT SELECTION OF TERMINAL button 511 causes the identification information of the next nearby communication terminal to be displayed on the pager by pager controller 617. Once the user of the pager has reached the desired communications terminal as displayed on display 506, the user actuates FORWARD CALLS TO SELECTED TERMINAL button 510 that results in pager controller 617 transmitting a signal to the selected communications terminal. The selected communications terminal is responsive to the signal to transmit the pager's identification to call processor 109. Call processor 109 then forwards all calls to the selected communications terminal. In addition, pager controller 617 lights lamp 502 that indicates that calls are being forwarded.

The call forwarding to the selected communication terminal can be deactivated in two ways. First, pager controller 617 continues to transmit on a periodic basis a signal to the selected communications terminal via transmitter 605 and transmit antenna 619. Once the selected communications terminal detects that the periodically transmitted signal has dropped below a predefined threshold, the selected communications terminal transmits to call processor 109 a request that the call forwarding feature to the selected communication terminal be deactivated. Second, the user of the pager can deactivate the signal by actuating FORWARD CALLS TO SELECTED SET button 510 for a second time. This second actuation results in pager controller 617 transmitting a signal to the selected communications terminal requesting that the selected communications terminal deactivate the call forwarding. Upon receipt of the signal, the selected communications terminal transmits a request to call processor 109 requesting that the call transfer feature be deactivated.

Also, pager controller 617 interacts with the selected communication terminal to implement the functions that are performed upon actuation of PRIORITY FORWARDING BUTTON 509 and LOCATION PRIVACY button 508. Receiver 607 and receive antenna 610 are also used by pager controller 617 to receive signal information from line interface circuits 124. These signals indicate incoming calls for the user of the pager in ways that are commonly employed in the art. If the call forwarding feature is not activated, the telephone number and name of the caller will be displayed on display 506 of the pager.

Pager controller 617 is connected to display 506 by conductor 602. Conductor 602 couples calling party number and/or other alphanumeric information to the display. Audio alerting device 505 of FIG. 5, e.g., a loud speaker, alerts a pager user of incoming calls and is connected to the pager controller via conductor 604. Once the call forwarding feature has been activated, the pager user can change the state of the priority and location privacy features by activating buttons 509 and 508 respectively of FIG. 5. Pager controller 617 also activates message waiting lamp 504 via conductor 612 in response to signals for that pager from line interface circuit 124 that there is an unretrieved electronic message for the user associated with the pager.

Figure 7:
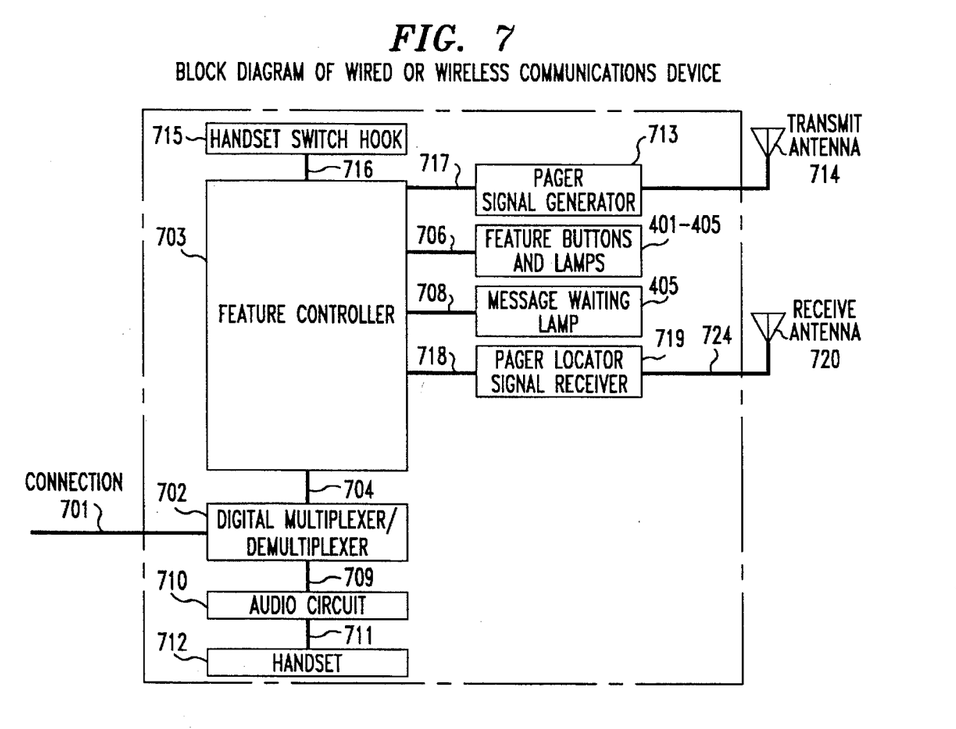
FIG. 7 is a block diagram of the telecommunication terminal of FIG. 4.

The block diagram of a wired or wireless communications terminal is shown in FIG. 7. Connection 701 connects digital multiplexer/demultiplexer 702 to the associated LIC port. In the case of a wired communications terminal, connection 701 to the associated LIC is a wired one, while in the case of a wireless communications terminal, connection 701 is a wireless one to the wireless communications terminal transceiver and thence is a wired connection to the associated LIC port. Digital multiplexer/demultiplexer 702 separates voice or data from the signaling information. Voice information coupled from the associated line interface circuit port is provided to audio circuit 710 via conductor 709. Within the audio circuit, the voice information is amplified and processed and thence coupled through conductor 711 to handset 712. In similar fashion, audio information received by the microphone (not shown) within handset 712 is also coupled by conductor 711 to audio circuit 710.

Feature controller 703 receives signaling information from digital multiplexer/demultiplexer 702 via conductor 704. The handset switch hook 715 couples information to feature controller 703 as to whether the handset is on-hook or off-hook via conductor 716. Feature controller 703 also receives information through conductor 706 from the feature button 402 and lamps 401, 403 and 405 of FIG. 4. Message waiting lamp 405 is activated or deactivated by feature controller 703 using signals coupled through conductor 708. Pager signal generator 713 outputs signals to antenna 714 which is used by the pager to confirm that the call forwarding to a selected communications terminal feature is operational and to light lamp 502. Such signals can also be used to activate the location privacy and priority forwarding lamps 507 and 503.

Pager locator signal receiver 719 receives signals from receive antenna 720 over conductor 724. These signals are received from nearby pagers for the purposes of initiating the call forwarding to a selected communications terminal feature for such pagers. Receiver 719 also receives information from a pager regarding the status of the location privacy and priority features and relay this information along with the forward to a selected communications terminal request to the associated line interface circuit via conductor 718, feature controller 703, conductor 704, digital multiplexer/demultiplexer 702, and connection 701. Pager locator signal receiver 719 may advantageously also include means for classifying signal strength and output a signal representative of this strength which is coupled through to connection 701.

Consider now the call processing operations that are performed by call processor 109 upon receipt of an incoming call. Call processing begins with execution of block 801 of FIG. 8. By execution of block 803, processor 109 examines the received dialed digits and finds the associated information in the translation memory 111 and the status memory 112. Call processing then continues with execution of decision block 805 which determines if the send all calls feature is activated by examining entry 305 of FIG. 3 for the extension number 301 matching the received dialed digits. If the answer is yes, then call processing proceeds via connector B to send the call to coverage by execution of block 1001 of FIG. 10. If the answer at decision block 805 is no, processing proceeds to decision block 807 which rings the called party's associated wired or wireless communications terminal based on the received dialed digits. Processing next proceeds through connector A to block 902 of FIG. 9.

Figure 9:
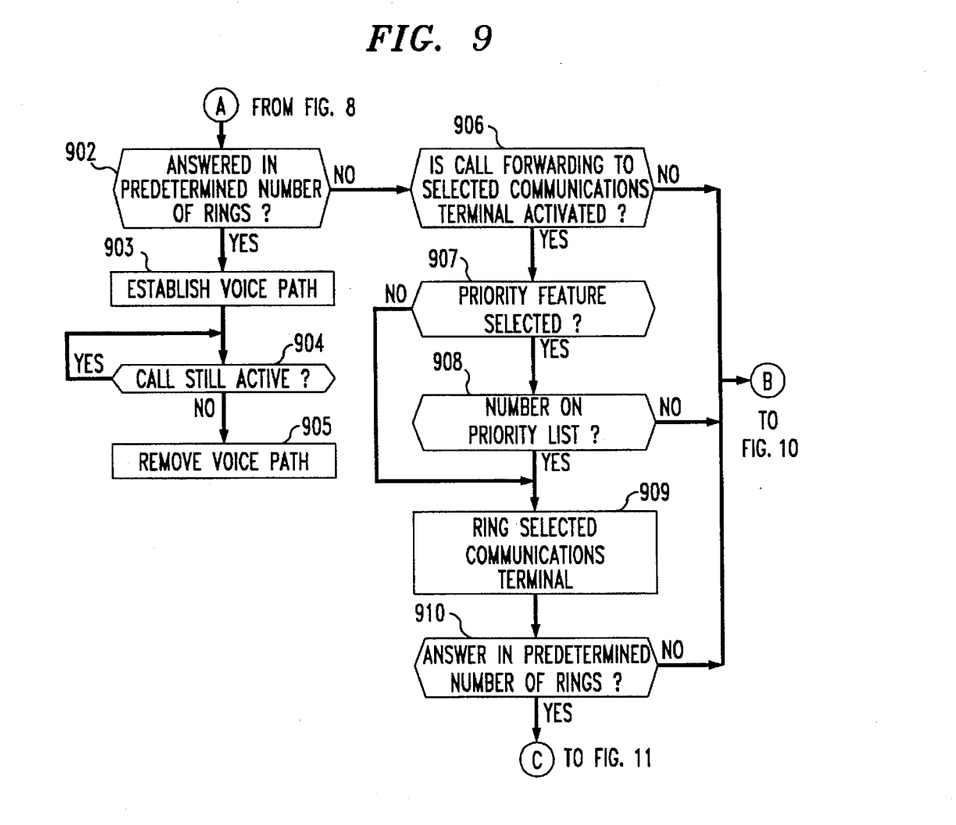

Referring to FIG. 9, at decision block 902, if the incoming communication is answered in a predetermined number of rings, a voice path is established by execution of block 903 and control is passed to decision block 904. If the call is still active at block 904, control loops back on block 904 until the answer at this block is no at which time, control is passed to block 905 where the voice path is removed and call processing is concluded.

If the answer to decision block 902 is no, decision block 906 is executed which determines if the call forwarding to a selected communications terminal feature is activated by examining entry 307 for the extension number 301 matching the received dialed digits. If the answer at block 906 is no, processing continues through connector B to block 1001 of FIG. 10. If the answer at block 906 is yes, call processing proceeds to decision block 907 which determines if the priority forwarding feature has been selected by determining if entry 307 for the extension number 301 matches the received dialed digits. If the answer is no at block 907, the selected communications terminal specified by entry 311 is rung by execution of block 909. If the answer at block 907 is yes, call processing proceeds to execution of decision block 908 which determines if the number of the calling party is on priority number list 209 for the extension number 201 matching the received dialed digits. If the answer at decision block 908 is no, then call processing is passed through connector B to block 1001 of FIG. 10. If the answer at block 908 is yes, then the selected communications terminal is rung by execution of block 909. If the incoming communications redirected to this terminal is not answered in a predetermined number of rings, as determined by execution of block 910, call processing proceeds through connector B to block 1001 of FIG. 10. If this is not the case, then call processing proceeds through connector C to block 1101 of FIG. 11.

Figure 11:
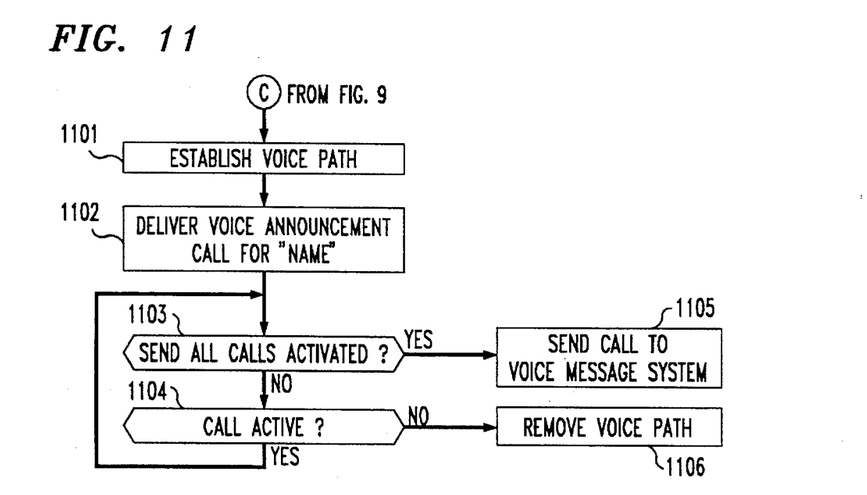

In FIG. 11, call processing first establishes a voice path by execution of block 1101 and passes control to block 1102. By execution of block 1102, an announcement from one of voice messaging systems 132-1 through 132-9 is delivered to the selected communications terminal which identifies that the call is for the called party associated with the pager whose user has activated his/her call forwarding to a selected communications terminal and not the person otherwise associated with the selected communications terminal, i.e., entry 205, listed for the extension number of the selected communications terminal. Such announcements can take several forms including voice, text, etc., and in the case of a text announcement can be provided by forwarding the text to a display associated with the selected communications terminal. Such displays (not shown in the Figures) are commonly provided in many of AT&T's voice communications terminals used in PBX applications. The announcement provided by execution of block 1102 could, for example, display the name of the user of the pager and not the name of the person normally associated with the selected communications terminal so that the latter will recognize that the incoming communications is for the pager user who is close by.

At this point, call processing proceeds to execution of decision block 1103 which determines if the send all calls feature is activated for the selected communications terminal. This could be desirable if the user of the pager does not want to take the call. If the answer at decision block 1103 is yes, then the call is sent to one of the voice messaging systems 132-1 through 132-9. If the answer at decision block 1103 is no, then call control is passed to decision block 1104 which determines if the call is still active. If the answer is yes, then control is passed back to block 1103. If the answer is no, then control is passed to block 1106 where the voice path is removed and call processing is concluded for this call.

Figure 8:
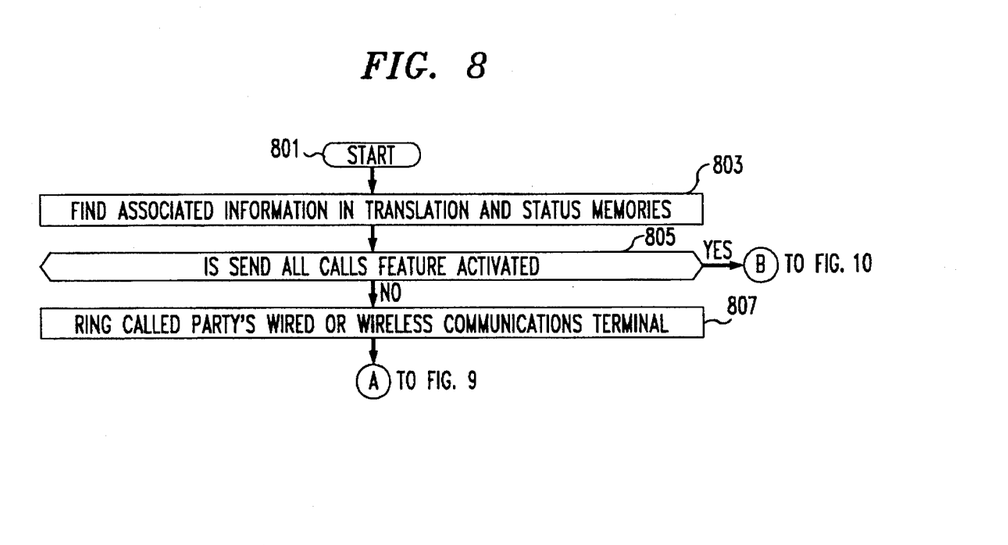
FIGS. 8–13 are flow charts depicting the operation of the telecommunication switching system and the pager.
Figure 10:
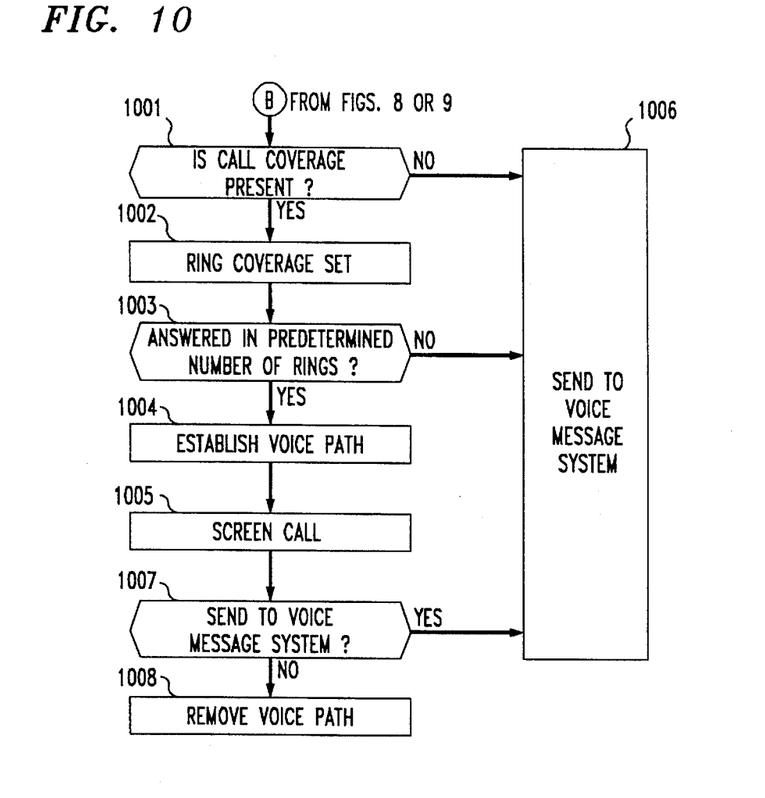

Now, returning to connector B of FIGS. 8 and 9, control is transferred to decision block 1001 of FIG. 10. By execution of the latter block, the presence or absence of a call coverage terminal is determined by examining entry 210 for the extension number 201 matching the received dialed digits when decision block 1001 follows execution of block 805. The same call coverage terminal determination is made for the extension number of the selected communications terminal when decision block 1001 follows execution of blocks 906, 907, 908 or 910 of FIG. 9. If the answer at decision block 1001 is no, the incoming communications is connected to a voice messaging system by execution of block 1006. If the answer at decision block 1001 is yes, a tinging signal is supplied to the call coverage terminal by execution of block 1002. If the call, as shown by execution of decision block 1003, is answered at the call coverage terminal in a predetermined number of rings, a voice path is established by execution of block 1004. If such answering does not occur at decision block 1003, the call is transferred by execution of block 1006 to a voice messaging system. Execution of block 1005 allows the person at the call coverage terminal to screen the call and decide as detected by execution of decision block 1007 whether or not to send the call to a voice messaging system. When the decision is yes at decision block 1007, the call is redirected again to a voice messaging system by execution of block 1006; and when the decision at block 1007 is no, the person at the call coverage terminal can take a message from the calling party after which the voice path is removed by execution of block 1008.

Figure 12:
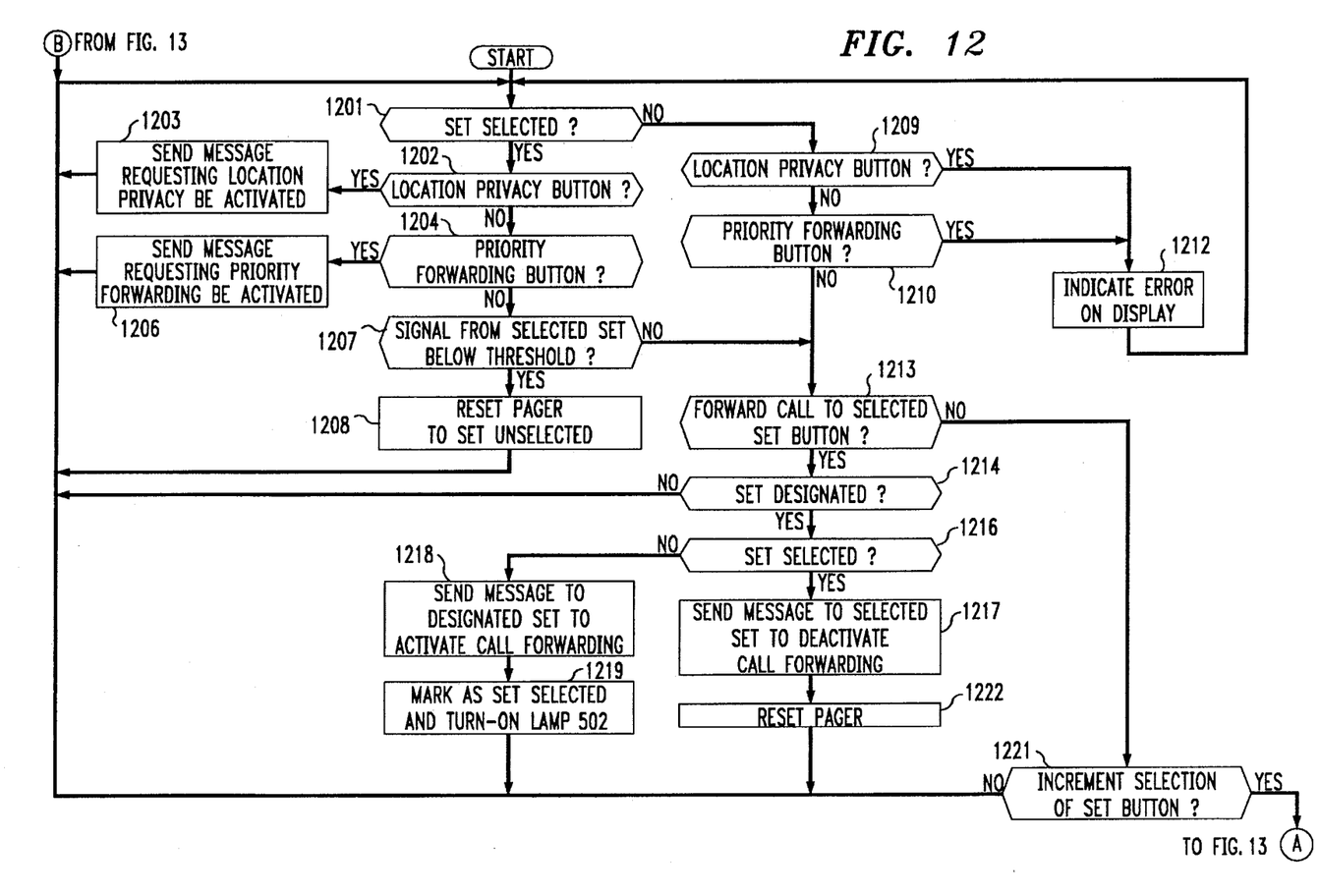
Figure 13:
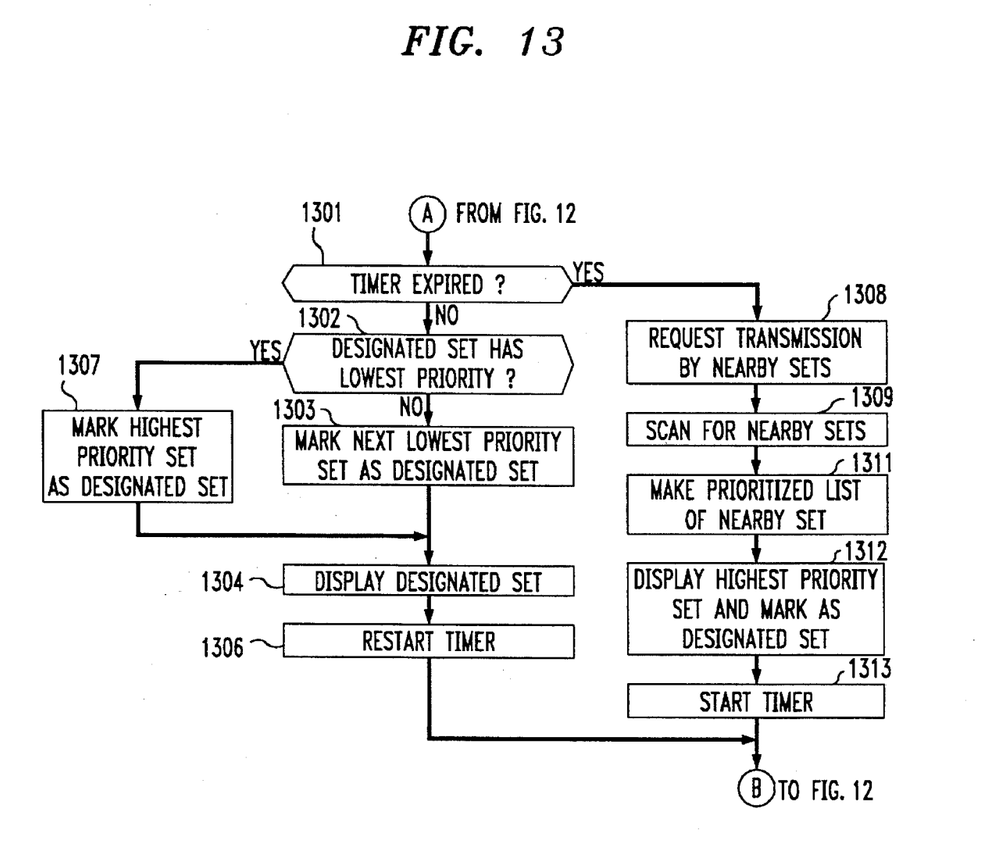

Consider now the operations, as illustrated in FIGS. 12 and 13, performed by pager controller 617 in responding to messages from a selected communications terminal, also referred to as a selected set, and actuation of the various buttons as illustrated in FIG. 5. First, decision block 1201 is executed to determine if a terminal has been selected. If the answer is yes, decision block 1202 is executed to determine if the LOCATION PRIVACY button 508 had been actuated. If the answer is yes, execution of block 1203 causes a message to be sent to the selected terminal requesting that the location privacy feature be activated. The selected terminal is responsive to this message to request activation of the feature by call processor 109. If the answer to decision block 1202 is no, decision block 1204 is executed to determine if PRIORITY FORWARDING button 509 had been actuated. If the answer is yes, block 1206 is executed which transmits a message requesting that the priority forwarding feature be activated to the selected communications terminal.

Returning to decision block 1204, if the answer is no, control is transferred to decision block 1207 which determines if the signal from the selected communications terminal has been received by receiver 607 is below a predefined threshold. If the answer is yes, block 1208 resets the pager to the terminal unselected state. In this state, all lamps illustrated in FIG. 5 of the pager are turned off. The execution of blocks 1207 and 1208 assures that calls will not be forwarded to a communications terminal if the pager is not in the nearby vicinity of the selected terminal. If the answer for decision block 1207 is no, control is transferred to decision block 1213.

Returning to decision block 1201, if the answer is no, control is transferred to decision block 1209. Decision blocks 1209 and 1210 determine if LOCATION PRIVACY button 508 or PRIORITY FORWARDING button 509 were actuated when a communications terminal had not been selected. If this occurs, the user of the pager has made a mistake and control is transferred to block 1212 which indicates an error on display 506. After execution of block 1212, control is transferred back to decision block 1201.

If neither LOCATION PRIVACY button 508 nor PRIORITY FORWARDING button 509 was actuated, control is transferred to decision block 1213 which determines if FORWARD CALLS TO SELECTED TERMINAL button 510 was actuated. If the answer is yes, control is transferred to decision block 1214 which determines if a communications terminal has yet been designated by utilization of the INCREMENT SELECTION OF TERMINAL button 511. If the answer is no, control is transferred back to decision block 1201 since this constitutes an error on the part of the user. If the answer is yes in decision block 1214, control is transferred to decision block 1216 which determines if a communications terminal has already been selected which would be indicated in FIG. 5 by lamp 502 being turned on. If the answer is yes in decision block 1216, this indicates that the user wants to deactivate call forwarding and execution of block 1217 sends a message to the selected communications terminal to deactivate call forwarding. Next, block 1222 is executed which resets the pager and finally control is transferred back to decision block 1201.

Returning to decision block 1216, if the answer is no, this indicates that the user has actuated FORWARD CALLS TO SELECTED TERMINAL button 510 to select the presently designated communications terminal whose identification information is displayed in display 506. Execution of block 1218 sends a message to the designated communications terminal requesting that this communications terminal transmit a message to call processor 109 resulting in that communications terminal being designated as the selected communications terminal. Finally, block 1219 is executed to mark the terminal as having been selected and to turn on lamp 502. The terminal having been marked as being selected is utilized by decision blocks 1201 and 1216. Control now is transferred back to decision block 1201.

Returning to decision block 1213, if the answer is no, control is transferred to decision block 1221. The latter decision block determines if INCREMENT SELECTION OF TERMINAL button 511 has been actuated. If the answer is no, control is returned to decision block 1201. If the answer is yes, control is transferred to decision block 1301 via connector A.

Decision block 1301 in FIG. 13 determines if a timer has timed out. This timer is started or restarted for each actuation of INCREMENT SELECTION OF TERMINAL button 511. The purpose of the timer is to give pager controller 617 the ability to distinguish between when actuation of button 511 indicates the user's desire to increment the display of the next communications terminal's identification information or indicates that the selection process is beginning. If decision block 1301 determines that the timer has expired, this defines that the user wants to commence the selection process and control is transferred to block 1308.

Block 1308 requests that all nearby communication terminals transmit their identification information. Block 1309 scans and identifies all the nearby communications terminals as well as their transmission signal strength. Block 1311 prioritizes the signal strengths of the communications terminals into a list. Block 1312 marks the highest priority communications terminal as the designated terminal and displays the identification information of that communications terminal on display 506. Block 1313 starts the timer and control is transferred back to decision block 1201 of FIG. 12.

Returning to decision block 1301, if the answer in that decision block is no, decision block 1302 is executed. If the designated terminal is the lowest priority communications terminal in the prioritized list prepared by block 1311, control is transferred to block 1307 which designates the highest priority communications terminal in the prioritized list as the designated communications terminal. Block 1307 then transfers control to block 1304. Returning to decision block 1302, if the answer is no, block 1303 is executed which marks the next lowest priority communications terminal as the designated terminal and control is transferred to block 1304. Block 1304 displays the identification of the designated terminal on display 506. Finally, block 1306 is executed to restart the timer and to transfer control back to decision block 1201 of FIG. 12.

It is to be understood that the above-described embodiments are merely illustrative of principles of the invention and that other arrangements may be devised by those skilled in the art without departing from the spirit or scope of the invention.

I claim:

1. An apparatus for allowing a user of a pager to control the termination of incoming telephone calls that are intended for the user, comprising:

means for identifying communication terminals to the pager;

means for selecting one of the identified communication terminal in response to a first message from the pager that is actuated by the user of the pager; and means for directing the incoming calls to the selected communication terminal.

2. The apparatus of claim 1 wherein the means for identifying is responsive to a second message from the pager.

3. The apparatus of claim 2 further comprises means for detecting that a distance between the selected communication terminal and the pager exceeds a predetermined amount and for signaling the means for directing of the distance; and the means for directing responsive to the signaling to cease directing incoming calls to the selected communication terminal.

4. The apparatus of claim 3 wherein the means for identifying comprises means in each of the communication terminals for transmitting the identity of each in response to the second message from the pager.

5. A pager for controlling the termination of incoming telephone calls intended for a user of the pager, comprising:

means for requesting that a plurality of communication terminals transmit identities of the communication terminals;

means for displaying the identities of the communication terminals;

means for selecting one of the communication terminals in response to input from the user; and means for transmitting a request to have incoming calls terminated on the selected communication terminal.

6. The pager of claim 5 further comprises means responsive to the transmitted identities for prioritizing the communication terminals.

7. The pager of claim 6 wherein means for displaying displays the identities of the communication terminals in order of prioritization.

8. The pager of claim 7 wherein the means for prioritizing uses signal strength of the transmissions from the communication terminals for prioritization.

9. The pager of claim 8 wherein the means for displaying further displays the identities one at a time in response to user actuation.

10. The pager of claim 9 wherein the means for selecting comprises means for designating the communication terminal whose identity is presently displayed.

11. The pager of claim 10 wherein the means for requesting comprises means for transmitting a message to the communication terminals.

12. The pager of claim 11 further comprises means for resetting the pager upon signal strength of transmissions from the selected communication terminal being below a predefined level.

13. A method for allowing a user of a pager to control the termination of incoming telephone calls that me intended for the user, comprising the steps of:

identifying communication terminals to the pager;

selecting one of the identified communication terminal in response to a first message from the pager that is actuated by the user of the pager; and directing the incoming calls to the selected communication terminal.

14. The method of claim 13 wherein the step of identifying is responsive to a second message from the pager.

15. The method of claim 14 further comprises the step of detecting that a distance between the selected communication terminal and the pager exceeds a predetermined amount and for signaling the step of directing of the distance; and the step of directing responsive to the signaling to cease directing incoming calls to the selected communication terminal.

16. The method of claim 15 wherein the step of identifying comprises the step of transmitting, in each of the communication terminals, the identity of each in response to the second message from the pager.

17. The method of claim 15 further comprises prioritizing the communication terminals in responsive to the transmitted identities.

18. The method of claim 17 wherein the means for displaying the identities of the communication terminals displays the identities in order of prioritization.

19. The method of claim 18 wherein the step of prioritizing uses signal strength of the transmissions from the communication terminals for prioritization.

20. The method of claim 19 wherein the step of displaying further displays the identities one at a time in response to user actuation.

21. The method of claim 20 wherein the step of selecting comprises the step of designating the communication terminal whose identity is presently displayed.

22. The method of claim 21 wherein the step of requesting comprises the step of transmitting a message to the communication terminals.

23. The method of claim 22 further comprises the step of resetting the pager upon signal strength of transmissions from the selected communication terminal being below a predefined level.

24. A method for controlling a pager to terminate incoming telephone calls intended for a user of the pager, comprising the steps of:

requesting that a plurality of communication terminals transmit identities of the communication terminals;

displaying the identities of the communication terminals;

selecting one of the communication terminals in response to input from the user; and transmitting a request to have incoming calls terminated on the selected communication terminal.

\* \* \* \* \*